United States Patent
Chapman et al.

(10) Patent No.: US 8,539,452 B2
(45) Date of Patent: *Sep. 17, 2013

(54) VIRTUAL MACHINE TOOL INTERFACE FOR TRACKING OBJECTS

(75) Inventors: Graham A. Chapman, Nepean (CA); Scott T. Jones, Austin, TX (US); Maciek Klimkowski, Ottawa (CA); Frank E. Levine, Austin, TX (US); Milena Milenkovic, Madison, AL (US)

(73) Assignee: International Business Machines Corporation, Armonk, NY (US)

( * ) Notice: Subject to any disclaimer, the term of this patent is extended or adjusted under 35 U.S.C. 154(b) by 898 days.

This patent is subject to a terminal disclaimer.

(21) Appl. No.: 12/435,982

(22) Filed: May 5, 2009

(65) Prior Publication Data

US 2010/0287352 A1    Nov. 11, 2010

(51) Int. Cl.
*G06F 9/44*    (2006.01)

(52) U.S. Cl.
USPC .......................................... 717/127; 717/128

(58) Field of Classification Search
None
See application file for complete search history.

(56) References Cited

U.S. PATENT DOCUMENTS

| | | | |
|---|---|---|---|
| 6,148,302 A * | 11/2000 | Beylin et al. ........................... | 1/1 |
| 6,658,652 B1 | 12/2003 | Alexander, III et al. | |
| 6,859,868 B2 | 2/2005 | Wright et al. | |
| 6,874,074 B1 | 3/2005 | Burton et al. | |
| 6,941,410 B1 | 9/2005 | Traversat et al. | |
| 7,197,521 B2 | 3/2007 | Subramoney et al. | |
| 7,325,106 B1 | 1/2008 | Dmitriev et al. | |
| 7,434,206 B2 | 10/2008 | Seidman et al. | |
| 7,506,318 B1 * | 3/2009 | Lindo et al. ................... | 717/130 |
| 2004/0128446 A1 * | 7/2004 | Dulong ......................... | 711/131 |
| 2004/0158589 A1 * | 8/2004 | Liang et al. .................. | 707/206 |
| 2007/0027942 A1 | 2/2007 | Trotter | |

* cited by examiner

*Primary Examiner* — Idriss N Alrobaye
*Assistant Examiner* — Ronald Modo
(74) *Attorney, Agent, or Firm* — Libby Toub; Robert C. Rolnik

(57) ABSTRACT

Disclosed is a computer program product to track allocation of a plurality of objects in a heap. A data processing system, during an object allocation, prevents an object from being moved to another place in memory or being deleted. The data processing system prevents such activity concurrently with garbage collection on a second object not currently being allocated. The data processing system notifies a profiler of object information based on the object allocation via a callback function, wherein object information is a one-to-one mapping of the object address. The data processing system revives garbage collector processing of the object.

12 Claims, 9 Drawing Sheets

VIRTUAL MACHINE TOOL INTERFACE FOR TRACKING OBJECTS

BACKGROUND OF THE INVENTION

1. Field of the Invention

The present invention relates generally to a data processing system and computer program product for debugging and analyzing code executing on a processor. More specifically, the present invention relates to tracking objects and their references to be able to understand what happens with the dynamic memory heap.

2. Description of the Related Art

Most of the programming languages/run time systems support dynamic memory allocation and reclamation. In object-oriented languages, memory can be reserved and released on a per-object basis, for example, through object allocation and reclamation. In some languages, for example, C++, freeing memory occupied by an object is done explicitly, by calling a special system function. In other object-oriented languages, for example, Java, that support so-called automatic memory management, memory occupied by objects that are not in use anymore is reclaimed automatically by a run time subsystem called a garbage collector. In Java, an object is considered unused and available for reclamation if it is not reachable directly or indirectly from any object graph root. The heap roots can include the set of system classes, Java Native Interface (JNI) globals, references from thread stacks, and other objects used as roots for the purposes of garbage collection. A heap is the area of memory where allocations of memory to objects occur on a dynamic basis.

A memory leak in a program written in a language such as C++, with manual memory management, is a well-known problem that happens when a program does not explicitly free some objects or memory area that is previously reserved. During program execution, allocations without reclamation may repeat over and over again. Accordingly, these allocations may ultimately exhaust all the available memory, thereby causing the program to crash.

In the past, software developers and analysts used Java™ Virtual Machine Profiler Interface (JVMPI) to get various profiling data from the Java Virtual Machine (JVM). Java is a trademark of Sun Microsystems, Inc. For heap profiling, JVMPI has several shortcomings. First, during heap dump (a snapshot of the current heap state), JVMPI creates a shadow copy of the heap, thus doubling the memory requirements. For very large heap sizes, heap dump is not feasible. Moreover, garbage collection is completely suspended during the JVMPI event that notifies a profiler about an object allocation. To identify an object, JVMPI uses an opaque pointer representing an object ID. Starting with the Java version 5.0, JVMPI is deprecated in the favor of new Java Virtual Machine Tool Interface (JVMTI).

As a response to anomalous memory allocation, as well as for other purposes, software developers use Java Virtual Machine Tool Interface (JVMTI) so they may develop debugging, profiling, and monitoring tools for Java™ Virtual Machines or JVMs. For example, JVMTI allows software developers to create software agents that monitor Java programming language applications. An agent registers to be notified about an event of interest by setting a callback function for that event and enabling the event, via calls to the corresponding JVMTI functions. The JVMTI set of functions and events can be extended in the manner described in Java™ Platform Profiling Architecture© 2004, Sun Microsystems, Inc. Accordingly, new functions and events can be added to the JVMTI.

JVMTI allows a user to attach a tag of type jlong (a 64 bit value) or object tag, to any Java object in the heap. This object tag is continually associated with the Java object, including movements caused by compaction after Garbage Collection (GC). The object tag can be user-supplied, using the JVMTI SetTag function. The object tag can be a mnemonic or other identifier so that an object tag is identifiable with tools that analyze the heap. Accordingly, the JVMTI Heap Iterate function can provide these tag values as a form of object identification when the developer invokes the heap iterate function to reveal the status of active or live objects within the data processing system.

All objects, features, and advantages of the present invention will become apparent in the following detailed written description.

SUMMARY OF THE INVENTION

The present invention relates to a computer program product to track allocation of plurality of objects in a heap. A data processing system, during an object allocation, prevents an object from being moved to another place in memory or being deleted. The data processing system prevents such activity concurrently with garbage collection on a second object not currently being allocated. The data processing system notifies a profiler of object information based on the object allocation via a callback function, wherein object information is a one-to-one mapping of the object address. The data processing system revives garbage collector processing of the object. When an object is moved or deleted, the data processing systems may notify a profiler about the old object autotag and a new object autotag.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
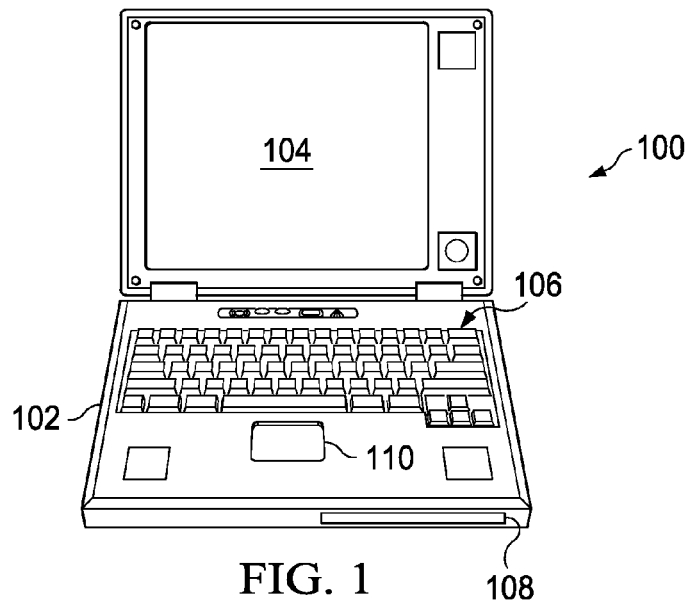
FIG. 1 is a data processing system in accordance with an illustrative embodiment of the invention.

FIG. 1 is a data processing system in which the embodiments may be implemented in accordance with a an illustrative embodiment. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer® computer or IntelliStation™ computer, which are products of International Business Machines Corporation, located in Armonk, N.Y. Although the depicted representation shows a computer, other embodiments may be implemented in other types of data processing systems, such as a network computer. Computer 100 also preferably includes a graphical user interface (GUI) that may be implemented by means of systems software residing in computer readable media in operation within computer 100.

Figure 2:
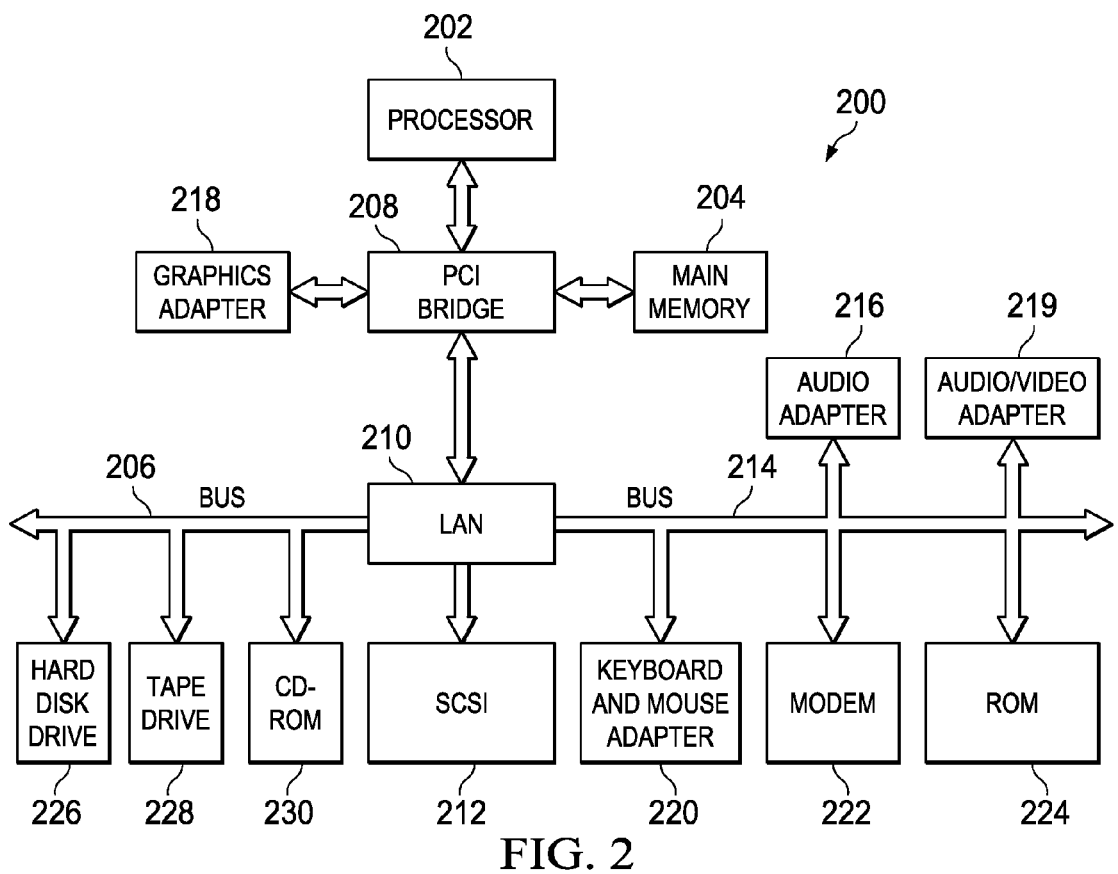
FIG. 2 is a block diagram of a data processing system in accordance with an illustrative embodiment of the invention.

FIG. 2 is a block diagram of a data processing system in accordance with an illustrative embodiment of the invention. Data processing system 200 is an example of a computer, such as computer 100 in FIG. 1, in which code or instructions implementing the processes of the embodiments may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object-oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. In addition, the processes of the illustrative embodiments may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the embodiments can be performed by processor 202 using computer implemented instructions, which may be located in a memory such as, for example, main memory 204, memory 224, or in one or more peripheral devices 226-230.

Figure 3A:
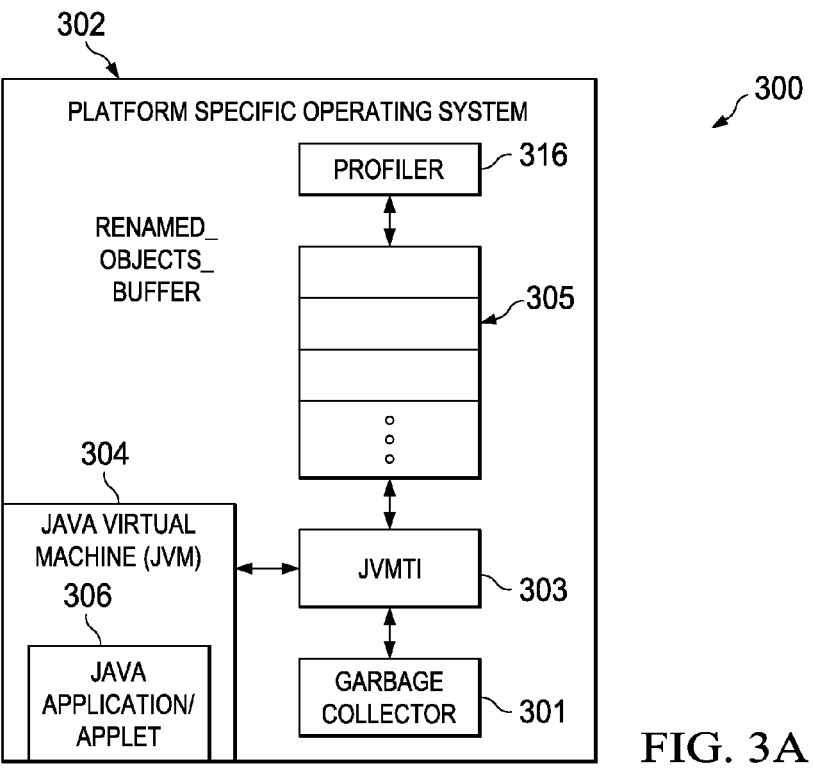
FIG. 3A is a block diagram of the relationship of software components operating in accordance with an illustrative embodiment of the invention.

FIG. 3A is a block diagram of the relationship of software components operating within a computer system in accordance with an illustrative embodiment of the invention. Java-based system 300 contains platform specific operating system 302 that provides hardware and system support to software executing on a specific hardware platform. Java Virtual Machine (JVM™) 304 is one software application that may execute in conjunction with the operating system. JVM is a trademark of Sun Microsystems, Inc. JVM 304 provides a Java run-time environment with the ability to execute Java application or applet 306, which is a program, servlet, or software component written in the Java programming language. The computer system in which JVM 304, profiler 316, and other software components operate may be similar to data processing system 200 or computer 100 described above. However, JVM 304 may be implemented in dedicated hardware on a so-called Java chip, Java-on-silicon, or Java processor with an embedded picoJava core.

A profiler is a debugging tool that permits system developers to review the resources that objects use from time to time, such as profiler 316. Profiler 316 maintains a repository of object information, including references to live objects in a manner that permits heap dumps. The profiler may use an interface to coordinate and discover object status. The interface can be a JVM Tool Interface (JVMTI), a JVM Profiler Interface (JVMPI), or any other suitable interface. In this example, profiler 316 relies on JVMTI 303 to obtain information concerning object allocations, moves and deletes. A class is a description or template for creating instances of objects. The class may include variables, methods, or both. An object is a dynamically created class instance or an array. The allocation of memory and accessing of variables for the object is called instantiation. The manner in which an object is instantiated in written Java code, is to state <Class-name> <object-name>="new"<Class-name>. An object can be a class, in which case, the class defines the manner of making an object. Accordingly, the class is a pattern for creating an object of that type. The class can further define the variables that an instantiated object will contain, as well as the methods of the instantiated object. Every object of that type can use variables and methods declared or described in the class.

A heap dump is a snapshot of memory that is allocated. The data of a heap dump shows the hierarchy of objects and the attendant memory utilization of each object, among other things. Because the heap dump is generally larger than most people can thoroughly read, tools to summarize the heap dump and synthesize helpful information are frequently used to help a user locate problem areas that may benefit from some further code development.

Objects and corresponding autotags, explained below, may be sent to the profiler in a buffer, such as buffer 305. A buffer is a block of memory that receives serial data in a manner that a receiving device or object may serially retrieve and process such data. An object's autotag is an address that indicates the memory location where that object is stored. Alternatively, an autotag can be a one-to-one mapping obtained from an address of the object, in a manner that is unique at a fixed point in time. Such a mapping can be, for example, an address in the object header stripped of some bits, an address rounded on a boundary, an address XORed with a value, etc. The autotags cannot be used for class objects. Instead, the JVMTI uses only object tags for class objects. The object tags can be either stored within the object itself, or in a separate hash table.

The use of an object's address to uniquely distinguish objects is convenient because each non-class object is always assigned a distinct address from any other live object and the JVM does not use any extra space for tag storage. Accordingly, the object's address can form at least part of the autotag corresponding to the object, when the object is a non-class object.

A garbage collector is a JVM component that allows memory occupied by dead objects to be made free for future allocation of objects. The garbage collector may consolidate live objects in memory such that free memory is available in at least one larger contiguous block. In this example, garbage collector 301, provides information concerning object moves to JVMTI 303. JVMTI may relay the old address and the new address corresponding to each object so moved. The new address may be used as a subsequently generated object tag. JVMTI 303 may relay this information to profiler via buffer 305.

At the center of a Java run-time environment is the JVM, which supports many aspects of Java's environment, including its architecture, security features, mobility across networks and platform independence.

The JVM is a virtual computer, that is, a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format. The compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Bytecodes may be translated into native code by a just-in-time compiler or JIT.

A JVM loads class files and executes the bytecodes within them. The class files are loaded by a class loader in the JVM. The class loader loads class files from an application and the class files from the Java application programming interfaces (APIs) which are needed by the application. The execution engine that executes the bytecodes may vary across platforms and implementations.

One type of software-based execution engine is a just-in-time (JIT) compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor.

Native methods are stored in a dynamically linked library whose exact form is platform specific.

Figure 3B:
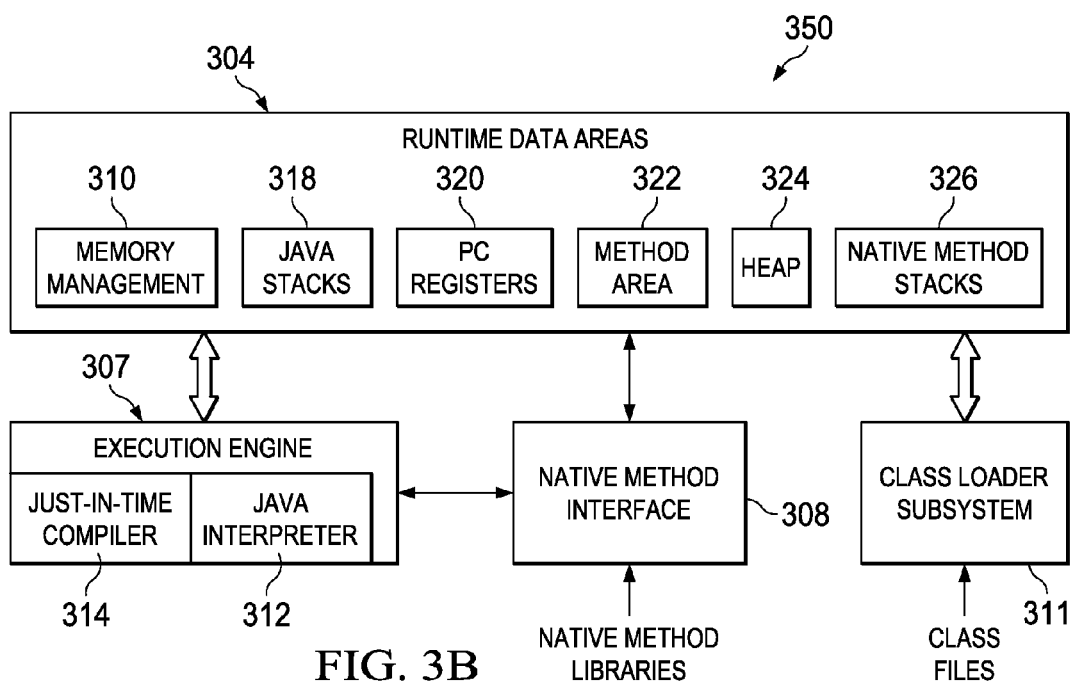
FIG. 3B is a block diagram of a JVM in accordance with an illustrative embodiment of the invention.

FIG. 3B is a block diagram of a JVM in accordance with an illustrative embodiment of the invention. JVM 350 includes class loader subsystem 311, which is a mechanism for loading types, such as classes and interfaces, given fully qualified names. JVM 350 also contains runtime data areas 304, execution engine 307, native method interface 308, and memory management 310. The native method interface can be, for example, a Java Native Interface (JNI). Execution engine 307 is a mechanism for executing instructions contained in the methods of classes loaded by class loader subsystem 311. Execution engine 307 may be, for example, Java interpreter 312 or just-in-time compiler 314. Native method interface 308 allows access to resources in the underlying operating system. Native method interface 308 may be, for example, the Java Native Interface (JNI).

Runtime data areas 304 contain native method stacks 322, Java stacks 318, Program Counter (PC) registers 320, method area 322, and heap 324. These different data areas represent the organization of memory needed by JVM 350 to execute a program.

Java stacks 318 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

Program counter (PC) registers 320 are used to indicate the next instruction to be executed. Each instantiated thread gets its own PC register and Java stack. If the thread is executing a method, the value of the PC register indicates the next instruction to execute. If the thread is executing a native method, then the contents of the PC register are undefined.

Native method stacks 316 stores the state of invocations of native methods. The state of native method invocations is stored in an implementation-dependent way in native method stacks, registers, or other implementation-dependent memory areas. In some JVM implementations, native method stacks 316 and Java stacks 318 are combined.

Method area 322 contains class data, while heap 324 contains all instantiated objects. The constant pool is located in method area 322 in these examples. The JVM specification strictly defines data types and operations. Most JVMs have one method area and one heap, each of which is shared by all threads running inside the JVM, such as JVM 350. When JVM 350 loads a class file, it parses information about a type from the binary data contained in the class file. JVM 350 places this type of information into method area 322. Each time a class instance or array is created, the memory for the new object is allocated from heap 324. JVM 350 includes an instruction that allocates memory space within the memory for heap 324 but includes no instruction for freeing that space within the memory. Memory management 310 in the depicted example manages memory space within the memory allocated to heap 324. Memory management 310 may include a garbage collector, which automatically reclaims memory used by objects that are no longer referenced. Additionally, a garbage collector also may move objects to reduce heap fragmentation.

The following definitions will be used in the description of the steps used by illustrative embodiments.

A Class is a combination of methods and data that are encapsulated in a file that defines how data are stored and accessed. A class may form a template from which, instances of running code may be created or instantiated.

A client is an executing program that relies on other entities or executing software to access or process data for the client. In some cases, the data to be processed may be a fully qualified class name, and the result returned may be an instance.

A code object or object is code that may be interpreted, JVM compiled, (i.e. bytecodes), or machine language. It may be an example of a class once instantiated for a specific purpose.

Object Instantiator or ObjectInstantiator is a program or class that creates an instance of an object when executed by a processor. The object created by the Object Instantiator conforms to the concept of an object as defined by Object Oriented Programming (OOP), but in general will be an encapsulated representation of actions and data which may or may not inherit from or allow its action and data to be inherited by other objects. The concept of ObjectInstantiator includes object creator or ObjectCreator.

A server is an executing program that acts as a resource to a client. The server may execute on a common computer with the client, or operate on a different computer. The server executes code to provide an output direct to the client, or produce an output or action of the computer or other resources of the server.

A callback function is a pointer to the executable code that is passed as an argument to another function. The callback function can be code, that when executed on a processor, handles an event. Accordingly, a callback function can be used to notify a client that an event has occurred.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable storage device(s) may be utilized. The term "computer usable storage device" does not encompass a signal propagation media. The computer-usable or computer-readable storage device may be, for example but not limited to, an electronic, magnetic, optical, or semiconductor system, apparatus, device. More specific examples (a non-exhaustive list) of the computer-readable storage device would include the following: a portable computer diskette, a hard disk, a random access memory (RAM), a read-only memory (ROM), an erasable programmable read-only memory (EPROM or Flash memory), a portable compact disc read-only memory (CDROM), an optical storage device or a magnetic storage device. Note that the computer-usable or computer-readable storage device could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage device may be any storage device that can contain or store the program for use by or in connection with the instruction execution system, apparatus, or device.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for tracking objects using a JVM tool interface. In particular, the JVM tool interface is extended to rely on object autotags to provide unique identifiers for each object. Accordingly, when the garbage collector moves an object, old (before the move) and new object autotags are sent to the profiler. In addition, one or more illustrative embodiments can disable garbage collection from moving or deleting an object while a profiler processes the tracking information for that object's allocation.

In FIG. 3A, object allocations, moves and deletes are accomplished by operation of the JVM allocating objects in a heap, and the garbage collector 301 subsequently moving and deleting objects at appropriate times.

Figure 4A:
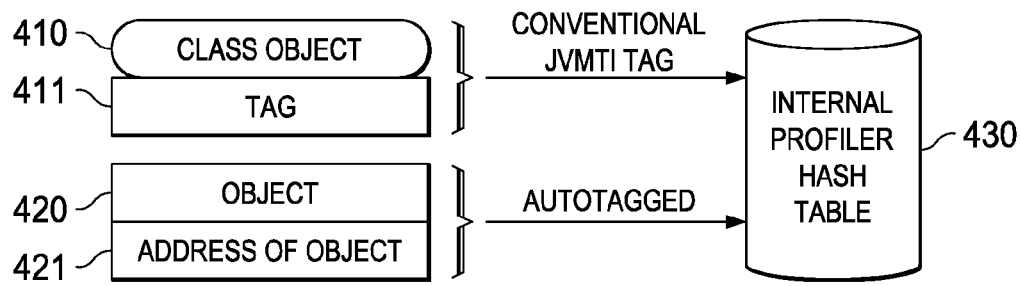
FIG. 4A is a block diagram of objects with autotagged features as combined within an internal profiler hash table in accordance with an illustrative embodiment of the invention.

FIG. 4A is a block diagram of objects with autotagged features as combined within an internal profiler hash table in accordance with an illustrative embodiment of the invention. The profiler hash table is a data structure internal to the profiler in the sense that the profiler, when instantiated, has memory allocated to store tags under the control of the profiler executing on a processor. The main advantage of a hash table in the profiler over a hash table in the JVM is less need for locking in the profiler, and thus lower performance impact when accessing the hash table. Objects are of two types: a class object; and an object that is not a class, also known as a non-class object. When allocating or moving the object, a distinction is made by the applicable method whether the object is a class object or not. Accordingly, the JVM sends notifications to the profiler only about non-class objects. In the profiler, a class entry in a hash table is matched to a user-defined tag. On the other hand, a non-class object entry in the object hash table is matched to the autotag of the object. Similarly, class object 410 can be assigned a user-defined tag or tag 411. A user-defined tag is a tag that a profiler links to a class object using, for example, the JVMTI function SetTag( ). The user-defined tag can be, for example, a 64-bit value. The information corresponding to each object can be stored to internal profiler hash table 430 or any other suitable data structure. For example, an entry in a class hash table can include the class name. An entry in an object hash table can include the object size and a pointer to the associated class table entry, among other possible information. A hash table is a data structure which uses a hash function to map identifiers to data values, in this case, object entries. Such identifiers mapped to data values can be, for example, tags. Object 420 is a non-class object. Accordingly, the object, by operation of one or more methods, described below, becomes associated with address of the object 421. This association can be established in internal profiler hash table 430.

Figure 4B:
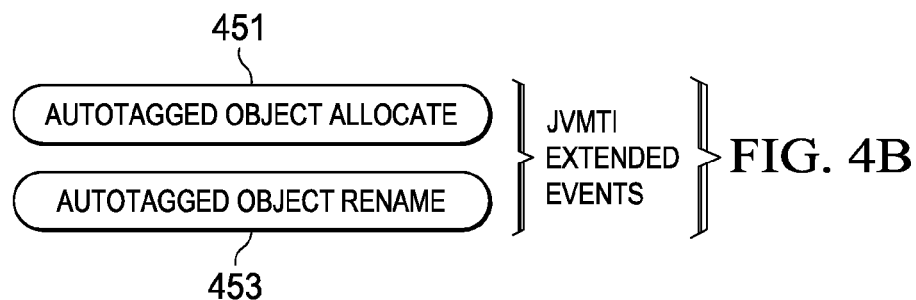
FIG. 4B is a block diagram of JVMTI extended events in accordance with an illustrative embodiment of the invention.

FIG. 4B is a block diagram of JVMTI extended events in accordance with an illustrative embodiment of the invention. The events include Autotagged Object Allocate 451 and Autotagged Object Rename 453.

Figure 4C:
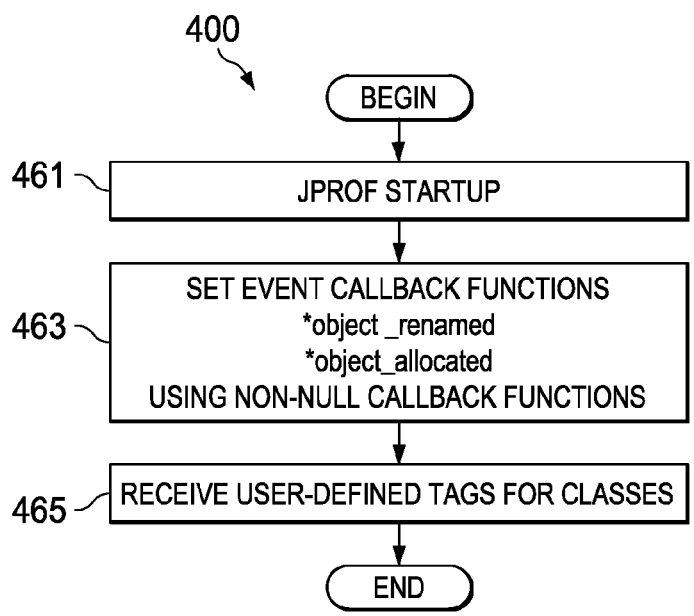
FIG. 4C is a flow chart of a process for initialization of a profiler in accordance with an illustrative embodiment of the invention.

FIG. 4C is a flow chart of a process for initialization of a profiler in accordance with an illustrative embodiment of the invention. Initially, a profiler starts up. In this example, the profiler is JPROF, a profiler in the Performance Inspector tools set, available at www.sourceforge.net. It is appreciated that other profilers known in the art may be used instead of JPROF, such as, for example, HPROF. HPROF is a Java 2 Second Edition (J2SE) command line profiling tool for heap and CPU profiling. Thus, JPROF starts up (step 461). Next, the initialization routine sets callback functions (step 463). An event callback function is a pointer to executable code that is passed as an argument to another function or object. The callback function can be code, that when executed on a processor, handles an event. In this case, the event callback functions are object_renamed and object_-allocated, which may be described, at FIG. 8 and FIG. 9, respectively. Each of these callback functions are set to non-null function addresses. In other words, the callback functions are assigned memory addresses of corresponding handler functions that are other then null. Next, the initialization routine can receive user-defined tags for each class (step 465). The initialization routine may rely on the profile being notified about an object allocation, for example, by using the JVMTI SetTag function. Such a function could be used if the object has not previously been associated with a tag for that object's class. Alternatively, the profiler's initialization routine can call the JVMTI function GetLoadedClasses to get the array of all classes already loaded in the JVM, and set their tags. In which case, tags for other classes can be set in response to the profiler receiving a notification about a class load event. Accordingly, for each class, a table or other data structure can be created when interesting objects are instantiated. The initialization routine may terminate thereafter.

Figure 5A:
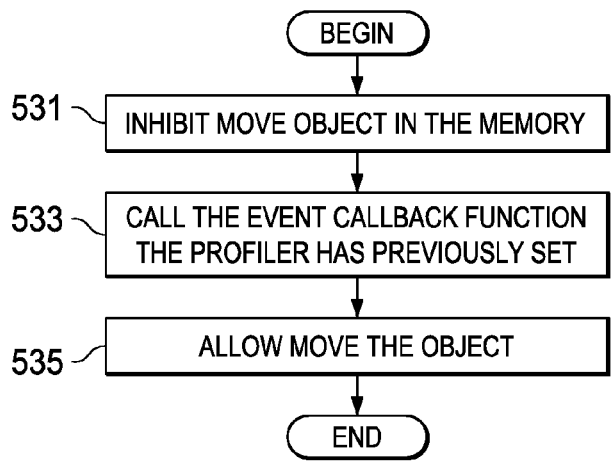
FIG. 5A is a flow chart of a method responding to an Autotagged Object Allocate event in accordance with an illustrative embodiment of the invention.

FIG. 5A is a flow chart of a method responding to an autotagged object allocate event, in accordance with an illustrative embodiment of the invention. Initially, the method inhibits the object from moving in memory (step 531). For example, the method can mark a bit in the object header to indicate it should not be moved. Accordingly, the garbage collection (GC) process may not move the object during periods when the object is marked as inhibited to move. Next, the method calls the event callback function previously set by the profiler (step 533). The event callback function can be set, for example, at initialization by initialization routine 400 of FIG. 4C. The method, in step 533, may pass the arguments used by the JVMTI VM Object Allocation event callback as well as the object's autotag, described above with reference to FIG. 3B. The VM Object Allocation event callback may pass the following data to the profiler: the JNI environment of the event (current) thread, JNI local reference to the thread allocating the object, JNI local reference to the object that was allocated, JNI local reference to the class of the object, and the size of the object (in bytes). The method may mark the object in memory being allowed to move after the event callback returns (step 535). Processing may terminate thereafter. The interval that follows step 531 through to just prior to step 535 is an example of object allocation.

Figure 5B:
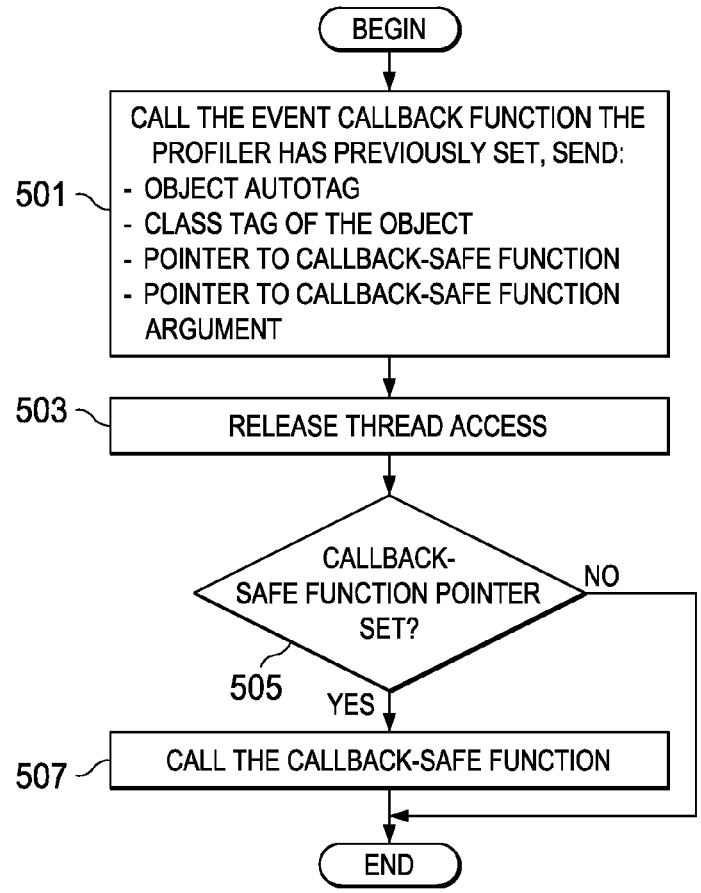
FIG. 5B is a flow chart of an alternative method responding to an Autotagged Object Allocate event in accordance with an illustrative embodiment of the invention.

FIG. 5B is a flow chart of a method responding to an autotagged object allocate event in accordance with an alternative embodiment of the invention. The method uses an optional two-step callback. Consequently, the event callback function, in a first step, may be restricted from calling JVMTI or JNI functions as explained below, the profiler can set a second, JVMTI callback-safe function in a second step by using the event callback function. Initially, in response to instantiation of an object, the method calls the event callback function that a profiler previously set (step 501). The call includes sending an object autotag, a tag of a class corresponding to the object, a pointer to a callback-safe function, for example, callback_safe_function_ptr, and a pointer to a callback-safe function argument, for example, callback_safe_function_arg. The value of the callback_safe_function_ptr can initially be NULL. If the profiler needs to call any JVMTI or JNI functions in relation to this event, the profiler can set the callback_safe_function_ptr to point to the wanted second-step callback function. The pointer callback_safe_function_arg will be passed as an argument to the second-step callback function. The thread access is not released by the JVM during the callback. Accordingly, the garbage collector is inhibited from moving the object at this time. The event callback function is restricted from calling JVMTI or JNI functions except monitor functions. Monitor functions can include, for example, CreateRawMonitor, DestroyRawMonitor, RawMonitorEnter/Exit, RawMonitorWait, RawMonitorNotify, RawMonitorNotifyAll.

Next, the method releases thread access to the object (step 503). The garbage collection process may now move the object. Next, the method determines whether the callback-safe function pointer is set (step 505). The callback-safe function pointer may be NULL, and accordingly unset. If so, then processing terminates thereafter. However, if the callback-safe function is set, the method may call the callback-safe function and pass the arguments used by the VM Object Allocation event callback as well as the received argument, for example, callback_safe_function_arg (step 507). The arguments used by the VM Object Allocation event callback can be, for example, the JNI environment of the current thread, JNI local reference to the thread allocating the object, JNI local reference to the object that was allocated, JNI local reference to the class of the object, and the size of the object (e.g., in bytes). Processing may terminate thereafter. The interval that during steps 501 through 507 is an example of object allocation. Alternatively, object allocation is prior to the callback function returning.

It is appreciated that the allocation event may be further modified to send a notification only for selected objects. The notification can be a call to the callback function. Object selection criteria can be any combination of object attributes, for example, an object's class, size, or the method allocating the object.

Figure 6A:
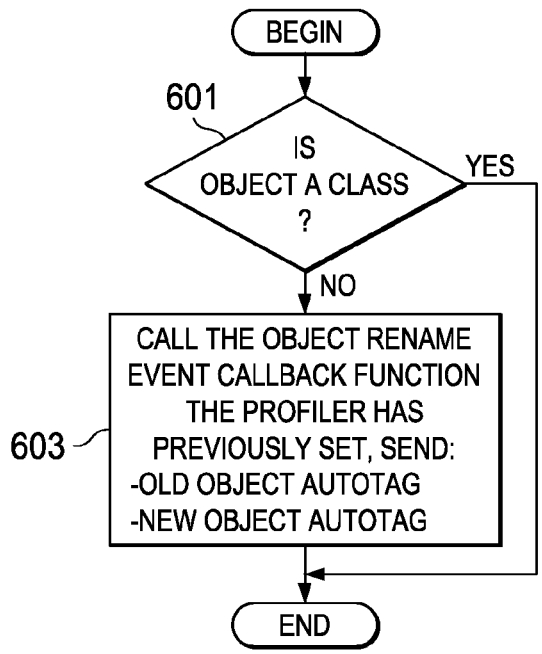
FIG. 6A is a flow chart of a method responding to an Object Move event in accordance with an illustrative embodiment of the invention.

FIG. 6A is a flow chart of a method responding to an Object Move Event in accordance with an illustrative embodiment of the invention. Initially, the method determines whether the object identified in an object move event is a class (step 601). If so, processing terminates. However, if the object is not a class, the method calls the object rename event callback function (step 603). The event callback function is called with parameters: 1) old object autotag and 2) new object autotag. An old autotag is the previous one-to-one address mapping related to that object before its move, as explained with reference to FIG. 3A. The new autotag can be a new one-to-one address mapping, after garbage collection moves the object. Object information, or non-class object information, is the combination of at least the old object autotag, and the new object autotag. In contrast, class object information is merely the object tag. Accordingly, the object move event handles object information, while ignoring class object information. Processing may terminate thereafter.

Figure 6B:
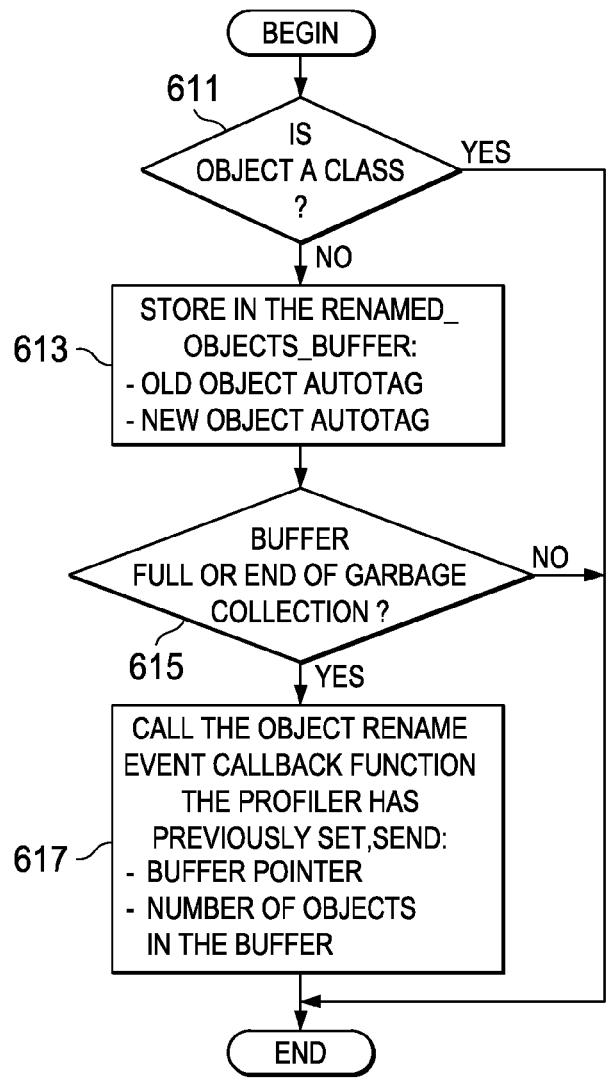
FIG. 6B is a flow chart of an alternative method responding to an Object Move event in accordance with an illustrative embodiment of the invention.

FIG. 6B is a flow chart of an alternative method responding to an Object Move event in accordance with an illustrative embodiment of the invention. Initially, the alternative method determines whether the object that is the subject of the move event is a class (step 611). If it is a class, processing terminates. However, if the object is not a class, the method stores the object move information to buffer (step 613). The buffer may be, for example, a renamed_objects_buffer 305 of FIG. 3A. The information stored to the buffer can include the old object autotag and the new object autotag. Next, the method may determine if either the buffer is full or the garbage collection is complete (step 615). If either condition is true, the alternative method calls the object rename event callback function (step 617). Accordingly, the method sends as parameters to the call the buffer pointer and the number of objects in the buffer. Processing terminates thereafter. A negative determination at step 615 also causes processing to terminate thereafter.

Figure 7A:
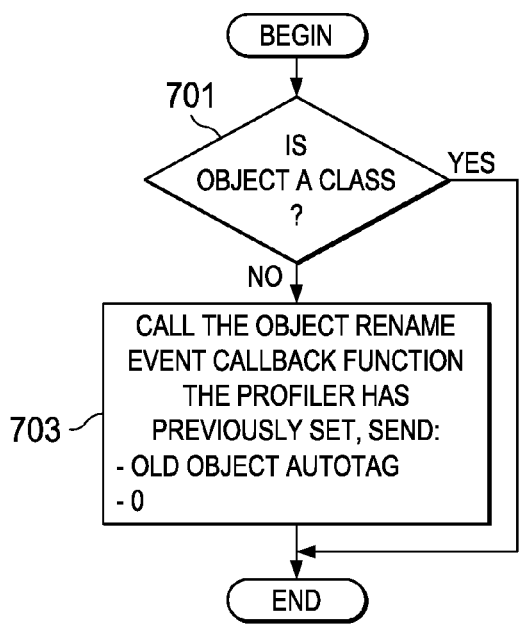
FIG. 7A is a flow chart of a method responding to an Object Delete event in accordance with an illustrative embodiment of the invention.

FIG. 7A is a flow chart of a method responding to an Object Delete event in accordance with an illustrative embodiment of the invention. Initially, the method determines whether the object identified in an object delete event is a class (step 701). If so, processing terminates. However, if the object is not a class, the method calls the object rename event callback function (step 703). The event callback function is called with parameters 1) old object autotag and 2) zero (0) in place of a new object autotag. Processing terminates after step 703 and a positive determination at step 701.

Figure 7B:
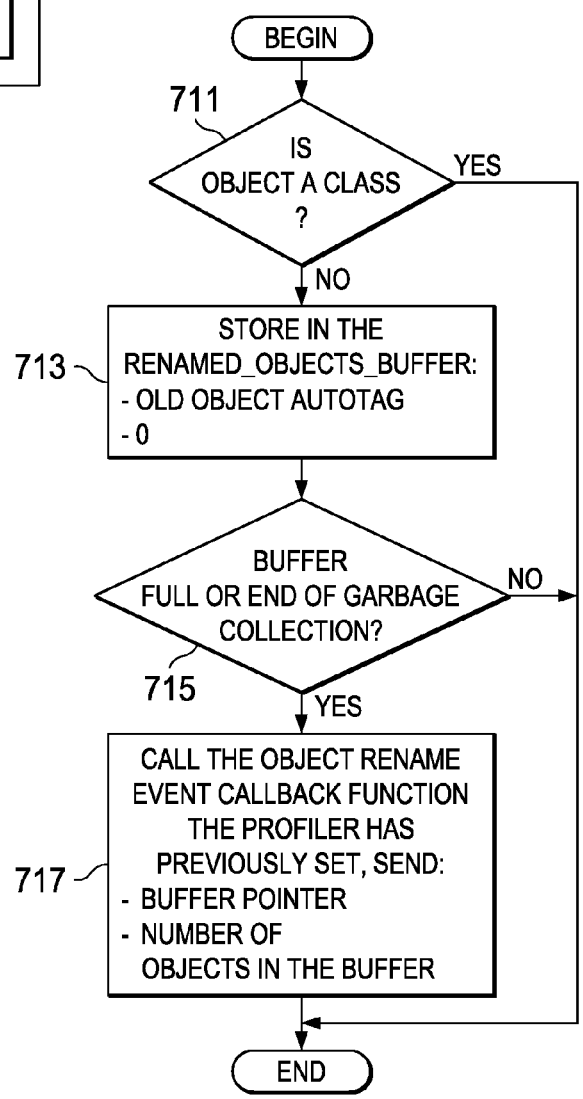
FIG. 7B is a flow chart of an alternative method responding to an Object Delete event in accordance with an illustrative embodiment of the invention.

FIG. 7B is a flow chart of an alternative method responding to an Object delete event in accordance with an illustrative embodiment of the invention. Initially, the alternative method determines whether the object that is the subject of the object delete event is a class (step 711). If it is a class, processing terminates. However, if the object is not a class, the method stores the object information to buffer (step 713). The buffer may be, for example, a renamed_objects_buffer 305 of FIG. 3A. The information stored to the buffer can include the old object autotag and 0. Next, the method may determine if either the buffer is full or the garbage collection is complete (step 715). If either condition is true, the alternative method calls the object rename event callback function (step 717). Accordingly, the method sends as parameters to the call the buffer pointer and the number of objects in the buffer. Processing terminates thereafter. A negative determination at step 715 also causes processing to terminate thereafter.

Figure 7C:
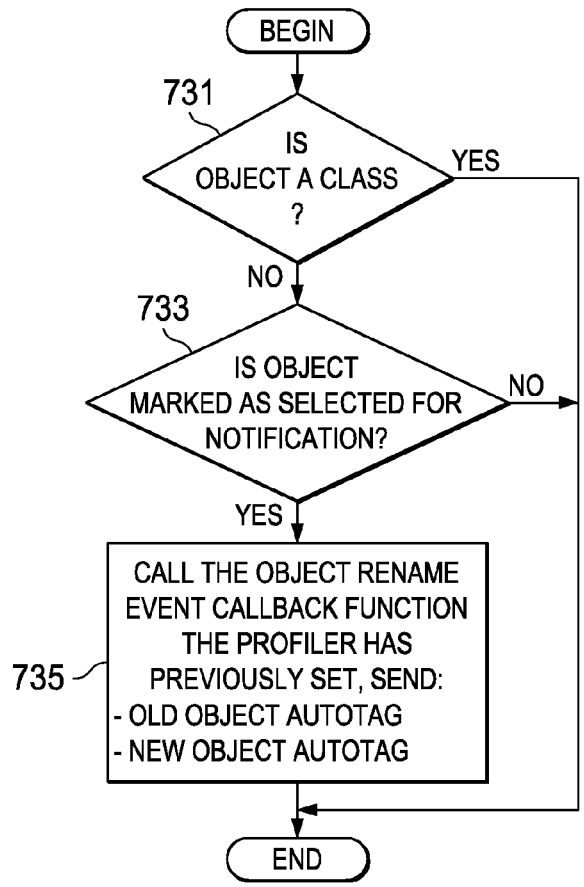
FIG. 7C is a flow chart of a method responding to an Object Move event with selective notification in accordance with an illustrative embodiment of the invention.

FIG. 7C is a flow chart of a method responding to an object move event with selective notification in accordance with an illustrative embodiment of the invention. Initially, the method determines whether the object that is the subject of the object move event is a class (step 731). If it is a class, processing terminates. However, if the object is not a class, the method determines whether the profiler has requested the JVM to mark the object as "selected for notification" (step 733). The mark could comprise a bit setting in the object header or in a table that corresponds to an identification of the object. Accordingly, the mark could be physically stored as a charge signifying a "1". Alternatively, a convention may be set to mark the object with a "0" when marking the object as selected for notification. The object can be marked as selected for (rename) notification at the time of the allocate event that instantiated the object or in a separate function call. Object selection criteria can be any combination of object attributes, for example, object's class, size, or the method allocating the object. Accordingly, a step additional to the ones shown in FIG. 5B can perform this initial marking. A negative determination causes the processing to terminate. However, a positive determination causes the method to call the object rename event callback function, thereby sending an old object autotag and a new object autotag (step 735). Processing may terminate thereafter.

It is appreciated that the allocation event may be further modified to selectively mark objects as marked for notification. The profiler can set the return value of the object allocation event callback function to indicate whether an object should be marked for notification. An object allocation event callback function is a function in a profiler, which is called from the JVM when an object has been allocated. The return value of the object allocation event callback function may be the mark, as described above.

Figure 7D:
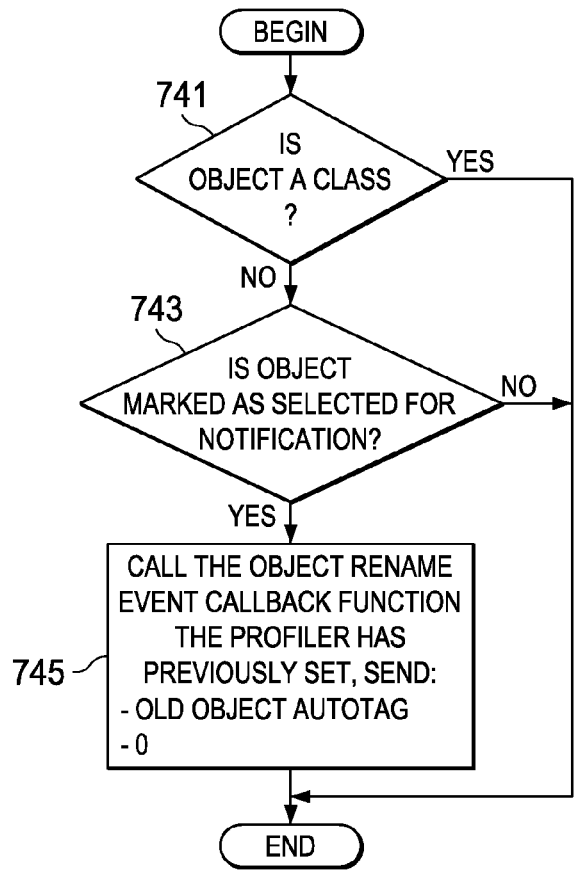
FIG. 7D is a flow chart of an alternative method responding to an Object Delete event with selective notification in accordance with an illustrative embodiment of the invention.

FIG. 7D is a flow chart of an alternative method responding to an object delete event with selective notification in accordance with an illustrative embodiment of the invention. Initially, the alternative method determines whether the object that is the subject of the object move event is a class (step 741). If it is a class, processing terminates. However, if the object is not a class, the method determines whether the object is marked as "selected for notification" (step 743). A negative determination causes the processing to terminate. However, a positive determination causes the method to call the object rename event callback function, thereby sending an old object autotag and 0 in place of a new object autotag (step 745). The use of "0" in the new object autotag indicates that the object is deleted. Processing may terminate thereafter.

Figure 8:
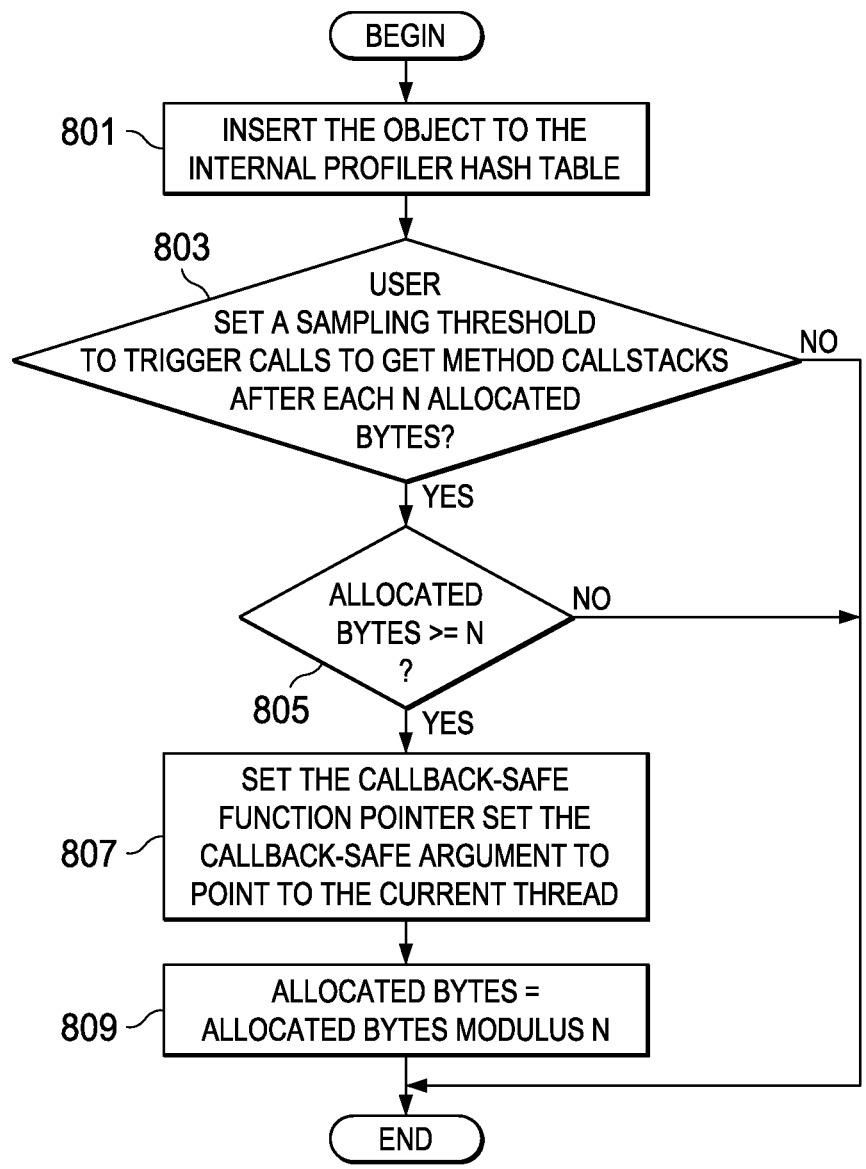
FIG. 8 is a flow chart of a profiler handling an Autotagged Object Allocate event, or object_renamed function, in accordance with an illustrative embodiment of the invention.

FIG. 8 is a flow chart of a profiler handling an autotagged object allocate event in accordance with an illustrative embodiment of the invention. Initially, the profiler inserts the object to the internal profiler hash table (step 801). The profiler can be profiler 316 of FIG. 3A. The internal profiler hash table can be internal profiler hash table 430 of FIG. 4A. Next, the profiler determines if the software developer has indicated a preference to get method call stacks after each sampling threshold, N, of allocated bytes (step 803). A sampling threshold is a limit or threshold of allocated bytes, specified by a user that indicates the interval in bytes that the user prefers to collect information concerning the JVM. If the user has specified a sampling threshold, the method determines whether the allocated bytes meet or exceed the sampling threshold, N (step 805). Allocated bytes are bytes allocated since any previous addition of an object to the internal profiler hash table, plus any residual allocated bytes that exceeded a sampling threshold (for example, the prior allocated bytes modulus N). If the determination at step 805 is positive, the profiler sets the callback-safe pointer and sets the callback-safe argument to point to the current thread (step 807). A current thread is the Java thread, which is currently being executed. Next, the profiler resets allocated bytes to be the current allocated bytes modulus the sampling threshold, N (step 809). Processing terminates after negative determinations to steps 803 and 805.

It is appreciated that other forms of threads may be within the scope of the invention, for example, threads that are units of execution within a process.

Figure 9:
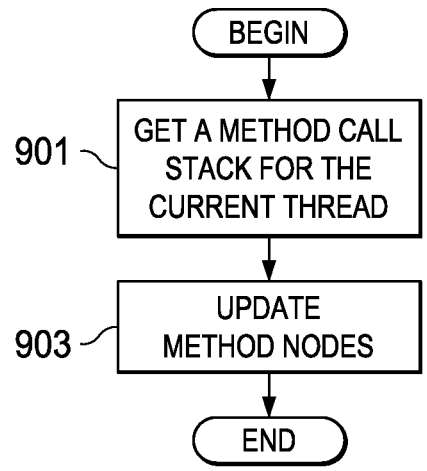
FIG. 9 is a flow chart of a profiler callback-safe function in accordance with an illustrative embodiment of the invention.

FIG. 9 is a flow chart of a profiler callback-safe function in accordance with an illustrative embodiment of the invention. Initially, the callback-safe function gets the method call stack for the current thread (step 901). Next, the callback-safe function updates method nodes that are associated with the thread (step 903). An update can include a situation where the profiler keeps method nodes (relevant information about a method) in a tree structure, where a parent node is the caller method and a child node is a method that is the target of the call. The tree structure enables keeping statistics for a method in a particular calling sequence. Optionally, the profiler can keep information about object allocations and frees. Alternatively, an update can be a node update, which can include a situation involving incrementing the node counter and optionally updating allocation information.

Figure 10:
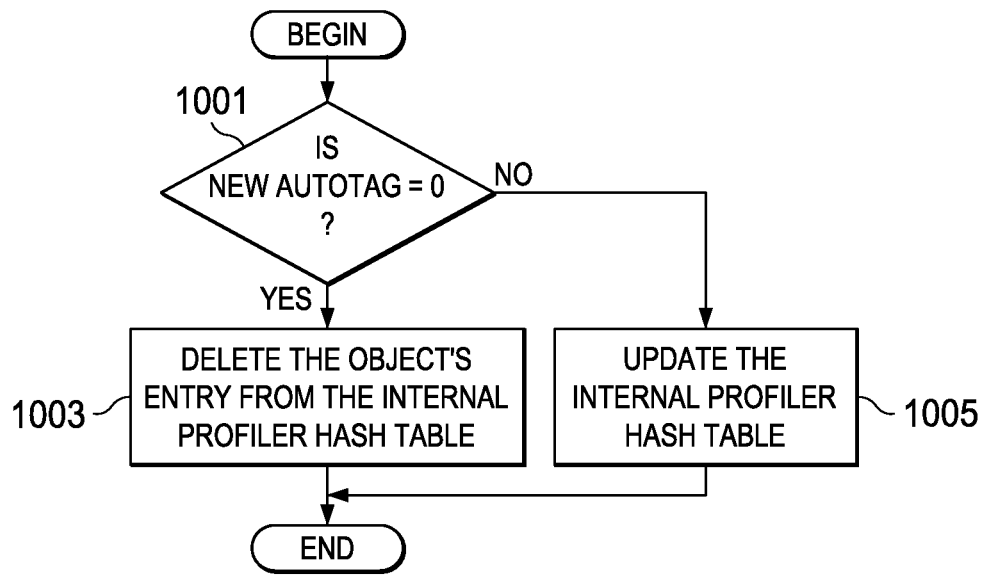
FIG. 10 is a flow chart of a profiler handling an object rename event in accordance with an illustrative embodiment of the invention.

FIG. 10 is a flow chart of a profiler handling an object rename event in accordance with an illustrative embodiment of the invention. Initially, the profiler may be invoked or called in response to the object rename event. The profiler determines whether a parameter for the new autotag is set to 0 (step 1001). The parameter may be set method steps 703 and 745, above. If the determination is positive, the profiler deletes the object's entry in the internal profiler hash table (step 1003). However, if the determination is negative, the profiler may update the internal profiler hash table to reflect the new autotag associated with the object (step 1005). Processing may terminate thereafter.

The illustrative embodiments permit a user to track objects using a JVM tool interface. Accordingly, by relying on a hash table or other data structures, a heap dump may be produced using fewer data processing resources than is currently possible by the prior art.

It is appreciated that the Java language is described, herein, as an example of a language style known as object oriented programming language. Accordingly, it is a known equivalent to aspects of C++, C#, and other object-oriented languages. Thus, within the scope of the invention are virtual machines in addition to Java Virtual Machines. Accordingly the "objects" of C++, and C# are also within the meaning of the term "object" as it is used, herein. Similarly, the term "class" as used herein, also includes within its meaning the classes as used in other object-oriented programs described in, for example, C++, C#, etc.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage device providing program code for use by or in connection with a computer or any instruction execution system. The term "computer usable storage device" does not encompass a signal propagation media. For the purposes of this description, a computer-usable or computer readable storage device can be any tangible apparatus that can contain or store the program for use by or in connection with the instruction execution system, apparatus, or device.

The storage device can be an electronic, magnetic, optical, or semiconductor system (or apparatus or device). Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product to track allocation of a plurality of objects in a heap, the computer program product comprising:
a computer usable storage device having computer usable program code embodied therewith, the computer program product comprising:
computer usable program code configured to prevent a first object from being moved to another place in memory or being deleted, during an object allocation, further comprising computer usable program code configured to prevent garbage collection for a thread that allocated the first object until a callback function returns, wherein some calls are restricted during the callback function, thereby permitting a profiler to set a pointer to a callback-safe function, wherein the callback-safe function is passed to a function as a pointer to executable code;
computer usable program code configured to prevent is performed concurrently with garbage collection on a second object not currently being allocated;
computer usable program code configured to notify the profiler of object information of the first object based on an object allocation via the callback function, wherein object information is a one-to-one mapping of the first object address; and
computer usable program code configured to revive garbage collector processing of the first object.

2. The computer program product of claim 1, wherein object allocation is prior to the callback function returning, and preventing comprises preventing only the first object from being moved, without affecting the second object.

3. The computer program product of claim 1, wherein computer usable program code configured to prevent comprises computer usable program code configured to notify the profiler of non-class object information without notifying the profiler of class object information, and sending an object tag to the profiler, wherein non-class object information comprises an autotag.

4. The computer program product of claim 1, wherein the profiler is notified about the object allocation for selected objects.

5. The computer program product of claim 1, wherein reviving garbage collector processing of the first object comprises moving the first object.

6. A computer program product to track movement and deletion of objects in a heap, the computer program product comprising:
a computer usable storage device having computer usable program code embodied therewith, the computer program product comprising:
computer usable program code configured to receive an event, wherein the event comprises an event selected from a group consisting of an object move event and an object delete event;
computer usable program code configured to notify a profiler of object information via a callback function, in response to receiving an event, wherein a virtual machine passes a first object tag and a subsequently generated object tag to the profiler, wherein the callback function is a pointer to executable code, and the pointer is passed as an argument to another function;
computer usable program code configured to store object information for objects selected for notification in a buffer;
computer usable program code configured to send the buffer to the profiler responsive to garbage collection completion; and
computer usable program code configured to receive user-defined tags for a plurality of classes without assigning a user-defined tag to a non-class object, wherein the user-defined tag is a tag that the profiler links to a class object using a Java virtual machine tool interface function.

7. The computer program product of claim 6, wherein the profiler is notified about the events for selected objects.

8. The computer program product of claim 6, wherein the profiler is configured to set a return value of an object allocation event callback function in order to deselect a object for move event notification and to deselect the object for delete event notification.

9. The computer program product of claim 8, wherein the object is an object defined in an object-oriented language.

10. The computer program product of claim 6, wherein the buffer is sent to the profiler in response to the buffer filling.

11. The computer program product of claim 6, wherein the buffer is sent to the profiler in response to garbage collection completion.

12. The computer program product of claim 6, wherein a virtual machine interface sends the object information to the profiler.

* * * * *